Sept. 8, 1959 R. CUNY 2,903,280
DEVICE FOR SEALING MOVING PARTS OF GAS-FILLED MACHINES
Filed May 24, 1957
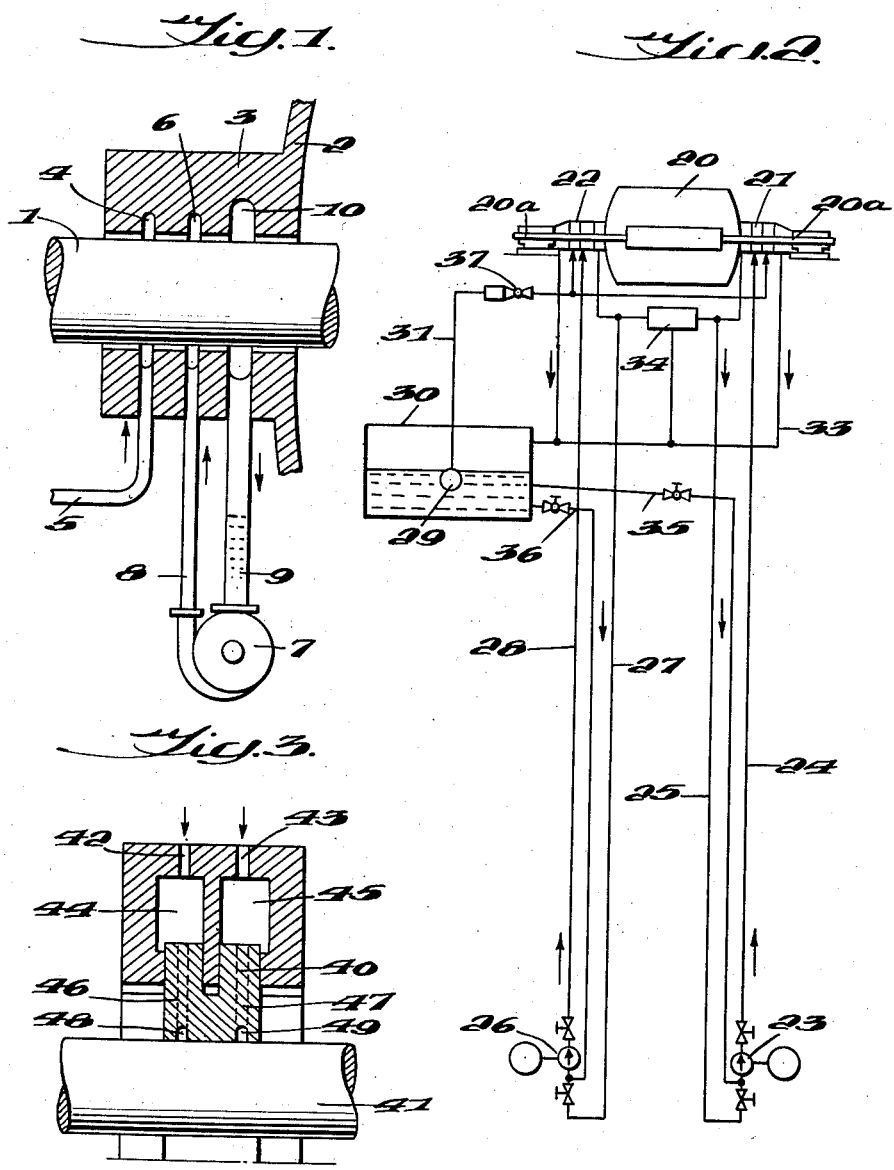

United States Patent Office 2,903,280
Patented Sept. 8, 1959

2,903,280

DEVICE FOR SEALING MOVING PARTS OF GAS-FILLED MACHINES

Robert Cuny, Wettingen, Switzerland, assignor to Aktiengesellschaft Brown, Boveri & Cie, Baden, Switzerland, a joint-stock company Application May 24, 1957, Serial No. 661,543

Claims priority, application Switzerland June 1, 1956

10 Claims. (Cl. 286—9)

This invention relates to the art of sealing moving parts of gas-filled machines.

In closed gas-filled machines, in particular in hydrogen-cooled electric turbogenerators, a reliable seal between the machine housing and a rotatable part protruding through said housing is of very great importance. To prevent the escape of cooling gas from the machine at the bearing points, it is known practice to provide fluid seals, the sealing fluid being circulated during operation. The fluid (oil) supplied under pressure produces in the bearing a blocking effect against the cooling gas in the interior of the machine as well as against the outside air. However, air penetrates by diffusion from the outside through the sealing liquid into the interior of the machine. Consequently, fresh cooling gas must be supplied to the machine from time to time; or, respectively, cooling gas mixed with air must be pumped off, because the invading air reduces the efficiency of the machine and there is danger of formation of a detonatable gas. When using oil as sealing liquid, therefore, the pressure oil enriched with air is usually deaerated by vacuum treatment.

Also, it has been proposed to use two sealing liquids conducted over the seal point in parallel paths, one being saturated with hydrogen and the other with air. This double circulation for the sealing liquid requires a complicated pressure regulation, because the penetration of the air-saturated sealing liquid into the machine should be prevented. On the other hand, such a double seal has the disadvantage that from time to time the air-saturated sealing liquid must be subjected to vacuum treatment.

The object of the present invention is to provide a device for the sealing of moving parts of gas-filled machines, in particular, of hydrogen-cooled turbogenerators, which also operates with two sealing liquids, of which the one adjacent the atmosphere is air-saturated and the one adjacent the gas is gas-saturated, but in which the mentioned disadvantages of the previous double sealing liquid seals are avoided. According to the invention, this is achieved in that the pump provided for the gas-side sealing liquid and its suction line are so arranged and dimensioned that the liquid column present in the suction line automatically regulates the gas-side sealing liquid pressure so that this pressure is at least as high as is the air-side sealing liquid pressure.

The invention will be further explained with reference to the drawings in which:

Fig. 1 shows diagrammatically the fundamental arrangement of the device according to the invention;

Fig. 2 illustrates the application of the invention to a hydrogen-cooled turbogenerator; and Fig. 3 illustrates a portion of this seal in longitudinal section and on a larger scale.

In Fig. 1, the numeral 1 denotes the shaft of a machine whose housing 2 is filled with gas. To seal the shaft at the point where it passes through the housing, there is provided a sealing device 3 in the form of a sleeve member surrounding said shaft adapted to employ two sealing liquid systems, which device permits a certain adjustable excess pressure relative to the hydrogen pressure inside the machine. As sealing liquid oil preferably is used, and an annular sealing zone 4 adjacent the outside air is supplied with air-saturated oil via conduit 5. The sealing device 3 is provided also on the side adjacent the gas-filled housing 2 with an annular sealing zone 6 which latter zone is supplied with gas-saturated oil by means of a pump 7 via a pressure line 8. The "gas-oil" circulation is completed by a suction line 9 and an additional annular zone 10, in sealing device 3, for the return flow of the sealing oil.

The pressure of the gas-saturated oil in the sealing zone 6 adapts itself automatically to the pressure of the air-saturated oil in sealing zone 4 if the provision is made that the rising and falling of the oil level occurs in the suction line 9 of pump 7. For this purpose the pump and its suction line are dimensioned accordingly and are so disposed that there is always a sufficient regulating height for the oil level in the suction line. The oil level in line 9 rises when the pressure of the air-saturated oil in the seal is greater than the pressure of the gas-saturated oil and more oil flows in from the air side. The oil column in the suction line 9 then rises and its weight increases. This causes the pressure at the pump entrance to be increased, and this pressure variation is transmitted to the pressure at the pump exit, since at constant number of revolutions the pressure difference remains constant across the pump. Consequently, the pressure of the gas-saturated oil in the seal is increased and the inflow of air-saturated oil decreases or ceases. Conversely, if the oil column in line 9 sinks, the pressure of the gas-saturated oil is too great and gas-saturated oil flows off. With sinking oil level the pressure of the gas-saturated oil decreases and the flowing-off ceases. The regulation of the pressure equality of the two sealing liquid streams thus occurs fully automatically, only very little sealing liquid flowing through the annular gap between the sealing zones 4 and 6, owing to which the gas losses remain very small.

In Fig. 2 the application of the described sealing device to a turbogenerator with hydrogen cooling is represented diagrammatically. The hydrogen-filled generator 20 is provided with seals 21 and 22 for the sealing of the rotor shaft 20a at both ends of the generator housing. Each of the two seals 21, 22 presents two sealing liquid systems, one being air-saturated and the other gas-saturated. As sealing liquid, oil is used, for example. The gas-side circulation of seal 21 is supplied by a pump 23 with the respective pressure line 24 and suction line 25, while for the gas-side circulation of seal 22 a pump 26 with suction line 27 and pressure line 28 is provided.

The sealing liquid for the air-saturated sealing liquid systems of each of the two seals is taken from a turbine oil reservoir 30 by a pump 29 and conveyed via a pressure line 31 to the seals 21 and 22. For great variations of the gas pressure in the generator, it is advisable to install in the pressure line 31 also a gas pressure-dependent oil pressure valve 37. The return flow of the air-side oil from seals 22 and 21 to tank 30 occurs via lines 32 and 33, respectively. Also, the gas-side sealing liquid systems are connected together and with reservoir 30 across a safety device 34. Reservoir 30 communicates also by way of lines 35 and 36 with the suction line 25 and 27, respectively.

The gas-side sealing liquid pressure in the two seals 21, 22 is automatically adjusted to the desired value by the liquid column present in suction lines 25, 27, namely, in an exactly analogous manner as described already for the seal according to Fig. 1. In case of a disturbance to the functioning of one of the pumps 23 or 26, the excess oil can drain off over the safety device 34, which is provided with a level-dependent discharge valve, e.g. a float valve (not shown), into the oil reservoir 30, so that overflow into the generator is prevented.

Also it is advisable to be able to stop the turbine oil circulation without having to interrupt the sealing operation, e.g., for carrying out bearing inspections. In such case, the sealing operation is maintained by pumps 23, 26 alone, in that oil in the suction lines 25, 27 is continuously supplied to them by way of the connecting lines 35, 36, so that the required excess pressure relative to the outside air is maintained. Air may be removed from the oil supplied across the lines 35, 36 in order to maintain the hydrogen unit in the generator with as small as possible a hydrogen consumption. The simplest way to achieve this is to displace the air by hydrogen by the counter-current principle, a conventional displacing device (not shown) being installed in said lines.

In the arrangement according to Fig. 2, the two pumps 23, 26 for the two gas-side sealing liquid streams can, to reduce pressure action or by the use of a de-gassing apparatus, be replaced by one pump common for both circulations. The air-saturated sealing liquid may be independent of the turbine oil system, if this is desired.

In Fig. 3, one of the shaft seals of the turbogenerator is shown in longitudinal section. In this model there is provided at the seal point a so-called "floating" ring 40 on the shaft 41, and air-saturated oil is supplied through an aperture 42, and gas-saturated oil through an aperture 43, to two separate sealing chambers 44 and 45, respectively, whence the two sealing liquids flow through the sealing ring, by way of bores 46 and 47, respectively, provided in the latter to annular sealing zones 48 and 49 respectively, the gas-saturated sealing liquid (from zone 49) and the air-saturated sealing liquid (from zone 48) coming into contact in the gap between ring 40 and shaft 41. By use of ring 40 the amount of oil flowing through the seal is reduced to a minimum.

I claim:

1. Sealing device for sealing a moving part of a gas-filled machine, in particular, a rotatable shaft of a hydrogen-cooled turbogenerator, utilizing two sealing liquids, of which the one adjacent the atmosphere is air-saturated and the one adjacent the gas-filled machine is gas saturated, a sleeve member surrounding the shaft, a first annular sealing groove in said sleeve member adjacent to said gas-filled machine, a second annular sealing groove in said sleeve member remote from said gas-filled machine, said sealing grooves communicating with each other, a pump, a first sealing liquid system communicating between the pressure side of said pump and said first sealing groove for supplying gas-saturated sealing liquid under pressure to said first sealing groove, a suction line for returning gas-saturated sealing liquid from said first sealing groove to the suction side of said pump, and a second sealing liquid system for supplying air-saturated sealing liquid under pressure to said second sealing groove characterized in that the liquid column present in the suction line automatically regulates the gas-side sealing liquid pressure in such a way that this pressure is at least as high as the air-side sealing liquid pressure.

2. Sealing device according to claim 1, characterized in that the two sealing liquid streams communicate with each other outside of the sleeve member.

3. Sealing device according to claim 1, characterized in that the two sealing liquid streams communicate with each other outside the sleeve member by means of a connecting path which contains a device for the deaeration of the sealing liquid.

4. Sealing device according to claim 1, characterized in that the air-saturated sealing liquid is taken from a fluid system of a machine driving the gas filled machine.

5. Sealing device according to claim 1, characterized in that the sealing liquid for the gas-saturated seals on both sides of the machine is supplied by a separate pump for each.

6. Sealing device according to claim 1, characterized in that there are present at the machine at least two seals each with a gas-saturated sealing liquid, the two liquids being circulated by a common pump.

7. Sealing device according to claim 1, characterized in that said first sealing liquid system communicates with a safety device for the discharge of excess sealing liquid.

8. Sealing device according to claim 1, characterized in that in the pressure line for the supply of air-saturated sealing liquid there is provided a pressure-regulating device which automatically adjusts the fluid pressure as a function of the gas pressure within the machine.

9. An arrangement for regulating the gas-side sealing liquid in a sealing device for sealing the shaft of gas-filled machines, in particular hydrogen-cooled turbogenerators, utilizing two sealing liquids, of which the one adjacent the atmosphere is air-saturated and the one adjacent the gas-filled machine is gas-saturated, and having two sealing liquid circuits which are in communication with each other inside the seal, a pump being provided for supplying the gas-side sealing liquid, characterized by the feature that the effective delivery pressure of the pump corresponding to the height of the suction pipe part below the seal is not smaller than the difference between the pressure of the sealing liquid in the seal and the gas pressure in the suction pipe and not so high that the suction pipe runs empty so that in said suction pipe there is always a column of sealing liquid, the height of which produces at least pressure equalization in the seal with the air-side sealing liquid.

10. Sealing device for sealing a rotatable shaft of a gas-filled machine, which comprises a sleeve member surrounding the shaft, a first annular sealing groove in said sleeve member adjacent to said gas-filled machine, a second annular sealing groove in said sleeve member remote from said gas-filled machine, said sealing grooves communicating with each other, a pump, a first sealing liquid system communicating between the pressure side of said pump and said first sealing groove for supplying gas-saturated sealing liquid under pressure to said first sealing groove, a suction line for returning gas-saturated sealing liquid from said first sealing groove to the suction side of said pump, a second sealing liquid system for supplying air-saturated sealing liquid under pressure to said second sealing groove, and means for adjustably maintaining the liquid pressure in said first sealing liquid system at least as high as is the liquid pressure in said second sealing liquid system.

References Cited in the file of this patent

UNITED STATES PATENTS

| | | |
|---|---|---|
| 1,559,182 | Rice | Oct. 27, 1925 |
| 1,841,863 | Van Rijswijk | Jan. 19, 1932 |
| 2,501,304 | Baudry et al. | Mar. 21, 1950 |
| 2,608,380 | Rice | Aug. 26, 1952 |
| 2,820,652 | Oechslin | Jan. 21, 1958 |